United States Patent
Wu et al.

(10) Patent No.: US 12,358,798 B2
(45) Date of Patent: Jul. 15, 2025

(54) IMPREGNATION LIQUID AND ACTIVATED CARBON CLOTH AND METHOD OF FORMING THE SAME

(71) Applicant: Industrial Technology Research Institute, Hsinchu (TW)

(72) Inventors: Ching-Mao Wu, Keelung (TW); Te-Yi Chang, Taoyuan (TW); Szu-Yin Lin, New Taipei (TW); Yao-Jheng Huang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 789 days.

(21) Appl. No.: 17/547,721

(22) Filed: Dec. 10, 2021

(65) Prior Publication Data
US 2023/0039398 A1 Feb. 9, 2023

(30) Foreign Application Priority Data
Jul. 27, 2021 (TW) ................. 110127485

(51) Int. Cl.
| C08J 5/24 | (2006.01) |
| C01B 32/318 | (2017.01) |
| C01B 32/354 | (2017.01) |
| D06M 10/10 | (2006.01) |
| D06M 11/74 | (2006.01) |
| D06M 15/327 | (2006.01) |
| D06M 15/71 | (2006.01) |

(52) U.S. Cl.
CPC .......... *C01B 32/318* (2017.08); *C01B 32/354* (2017.08); *C08J 5/244* (2021.05); *C08J 5/249* (2021.05); *D06M 10/10* (2013.01); *D06M 11/74* (2013.01); *D06M 15/327* (2013.01); *D06M 15/71* (2013.01); *C01P 2006/12* (2013.01); *C08J 2361/06* (2013.01)

(58) Field of Classification Search
CPC ... C01B 32/354; C01B 32/318; C01J 2361/06
See application file for complete search history.

(56) References Cited

U.S. PATENT DOCUMENTS

| 8,273,259 B1 | 9/2012 | Qiu et al. | |
| 2018/0086717 A1* | 3/2018 | Hikida | B01J 20/262 |

FOREIGN PATENT DOCUMENTS

| CN | 1524611 A | 9/2004 |
| CN | 1235679 C | 1/2006 |
| CN | 106458604 A | 2/2017 |
| CN | 109501693 A | 3/2019 |
| CN | 110093687 A | 8/2019 |
| CN | 110239164 A | 9/2019 |
| JP | 2004-43997 A | 2/2004 |
| JP | 2004-43998 A | 2/2004 |
| KR | 2000-0038842 A | 7/2000 |
| TW | 291329822 A1 | 7/2013 |
| TW | 201331435 A1 | 8/2013 |
| TW | 202018766 A | 5/2020 |

OTHER PUBLICATIONS

Taiwanese Office Action and Search Report for Taiwanese Application No. 110127485, dated Feb. 8, 2022.
Huang et al., "Reaction process for $ZnCl_2$ activation of phenol liquefied wood fibers", RSC Advances, 2016, vol. 6, pp. 78909-78917.
Lee et al., "Preparation of novolac-type phenol-based activated carbon with a hierarchical pore structure and its electric double-layer capacitor performance", Carbon Letters 2014, vol. 15, No. 3, pp. 192-197.
Yue et al., "Preparation of fibrous porous materials by chemical activation 1. $ZnCl_2$ activation of polymer-coated fibers", Carbon 2002, vol. 40, pp. 1181-1191.
Zheng et al., "Activated carbon fiber composites for gas phase ammonia adsorption", Microporous and Mesoporous Materials 2016, vol. 234, pp. 146-154.
Chinese Office Action dated Dec. 14, 2023 for Application No. 202111060146.1.
Taiwanese Office Action and Search Report for Taiwanese Application No. 110127485, dated May 17, 2022.

* cited by examiner

*Primary Examiner* — Anthony J Zimmer
*Assistant Examiner* — Annette Phan
(74) *Attorney, Agent, or Firm* — Birch, Stewart, Kolasch & Birch, LLP

(57) ABSTRACT

An impregnation liquid is provided, which includes (A) phenolic resin, (B) diazonaphthoquinone-based compound or a derivative thereof, (C) ionic compound, and (D) organic solvent. The weight of (A) phenolic resin and the weight of (B) diazonaphthoquinone-based compound or a derivative thereof have a ratio of 0.2:0.8 to 0.9:0.1, and the weight of (C) ionic compound and the total weight of (A) phenolic resin and (B) diazonaphthoquinone-based compound or a derivative thereof have a ratio of 0.2:1 to 1.4:1. The impregnation liquid can be used to form an activated carbon layer to wrap and to be directly in contact with the surface of a mesh.

9 Claims, No Drawings

IMPREGNATION LIQUID AND ACTIVATED CARBON CLOTH AND METHOD OF FORMING THE SAME

CROSS REFERENCE TO RELATED APPLICATIONS

The present application is based on, and claims priority from, Taiwan Application Serial Number 110127485, filed on Jul. 27, 2021, the disclosure of which is hereby incorporated by reference herein in its entirety.

TECHNICAL FIELD

The technical field relates to an activated carbon cloth, and in particular it relates to an impregnation liquid for preparing an activated carbon cloth.

BACKGROUND

The optoelectronic manufacturing processes produce a large amount of positive photoresist waste, in which the solid component includes phenolic resin and diazonaphthoquinone. The current major treatment with the solid component is incineration, but it generates an odorous waste gas. If a way can be found to repurpose or reuse this photoresist waste product, it will be beneficial to protecting the environment.

SUMMARY

One embodiment of the disclosure provides an impregnation liquid, including: (A) phenolic resin; (B) diazonaphthoquinone-based compound or a derivative thereof; (C) ionic compound; and (D) organic solvent, wherein the weight of (A) phenolic resin and the weight of (B) diazonaphthoquinone-based compound or a derivative thereof have a ratio of 0.2:0.8 to 0.9:0.1, and wherein the weight of (C) ionic compound and the total weight of (A) phenolic resin and (B) diazonaphthoquinone-based compound or a derivative thereof have a ratio of 0.2:1 to 1.4:1.

One embodiment of the disclosure provides a method of forming activated carbon cloth, including: putting a mesh into the described impregnation liquid, wherein the impregnation liquid adheres onto the surface of the mesh; removing (D) organic solvent of the impregnation liquid to remain a solid component; and carbonizing the solid component to form an activated carbon layer to wrap and to be in contact with the surface of the mesh, thereby obtaining an activated carbon cloth.

One embodiment of the disclosure provides an activated carbon cloth, including a mesh and an activated carbon layer, which wraps the mesh and is in contact with the surface of the mesh.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides an impregnation liquid, including: (A) phenolic resin; (B) diazonaphthoquinone-based compound or a derivative thereof; (C) ionic compound; and (D) organic solvent. (A) Phenolic resin and (B) diazonaphthoquinone-based compound or a derivative thereof may come from unexposed recycled photoresist, or be formed by mixing commercially available phenolic resin and diazonaphthoquinone-based compound. Alternatively, the commercially available phenolic resin or diazonaphthoquinone-based compound can be added to the unexposed recycled photoresist to adjust the ratio of (A) phenolic resin and (B) diazonaphthoquinone-based compound or a derivative thereof.

In one embodiment, the weight of (A) phenolic resin and the weight of (B) diazonaphthoquinone-based compound or a derivative thereof have a ratio of 0.2:0.8 to 0.9:0.1. If the amount of (A) phenolic resin is too high, the specific surface area of the final formed activated carbon layer will be too small. If the amount of (B) diazonaphthoquinone-based compound or a derivative thereof is too high, the solid component of the impregnation liquid cannot adhere onto the surface of the mesh during impregnation. In some embodiments, the weight of (C) ionic compound and the total weight of (A) phenolic resin and (B) diazonaphthoquinone-based compound or a derivative thereof have a ratio of 0.2:1 to 1.4:1. If the amount of (C) ionic compound in the impregnation liquid is too low, the specific surface area of the final formed activated carbon layer will be too small. If the amount of (C) ionic compound in the impregnation liquid is too high, the impregnation liquid cannot adhere onto the mesh and fail to form the activated carbon cloth.

In some embodiments, the total weight of (A) phenolic resin, (B) diazonaphthoquinone-based compound or a derivative thereof, and (C) ionic compound and the weight of (D) organic solvent have a ratio of 0.1:0.9 to 0.5:0.5. If the amount of (D) organic solvent is too low, (A) phenolic resin, (B) diazonaphthoquinone-based compound or a derivative thereof, and (C) ionic compound will be precipitated and cannot be dissolved. If the amount of (D) organic solvent is too high, it cannot form a sufficient activated carbon layer to wrap the mesh. In some embodiments, (A) phenolic resin is thermoplastic phenolic resin. If (A) phenolic resin is thermoset phenolic resin, it cannot be dissolved in (D) organic solvent to form the impregnation liquid.

In some embodiments, (B) diazonaphthoquinone-based compound or a derivative thereof includes diazonaphthoquinone-based compound, sulfonated diazonaphthoquinone compound, sulfonated indeno-enone compound, sulfonated indeno-carboxylic acid compound, or a combination thereof. In general, the major composition of (B) diazonaphthoquinone-based compound or a derivative thereof is diazonaphthoquinone-based compound, and contains at most 10% derivative. The derivative mainly comes from the recycle process, in which the diazonaphthoquinone-based compound is thermally decomposed to loss the diazo group to form the derivative; the diazonaphthoquinone-based compound reacts with water to form the derivative, or the diazonaphthoquinone-based compound reacts in another way to form the derivative. Because the diazonaphthoquinone-based compound in the unexposed recycled photoresist may form a little derivative, which is improper to be used in lithography process again. However, the derivative of the diazonaphthoquinone-based compound will not deteriorate the product of the carbonization process in the disclosure. In other words, (B) diazonaphthoquinone-based compound or a derivative thereof can be used in the impregnation liquid of the embodiments in the disclosure.

In some embodiments, (C) ionic compound may include zinc chloride, calcium carbonate, calcium oxide, magnesium carbonate, or another divalent or trivalent ionic compound. Note that when the impregnation liquid is used to impregnate a glass fabric, (C) ionic compound should be zinc chloride or another neutral species to prevent damaging the glass fabric.

In some embodiments, (D) organic solvent may include propylene glycol methyl ether acetate (PGMEA), propylene glycol methyl ether (PGME), N-methylpyrrolidone (NMP), acetone, or butanone (MEK). Specifically, PGMEA can be adopted as (D) organic solvent, but the disclosure is not limited thereto.

One embodiment of the disclosure provides a method of forming activated carbon cloth, including: putting a mesh into the described impregnation liquid, and the impregnation liquid adheres onto the surface of the mesh. Subsequently, (D) organic solvent of the impregnation liquid is removed to remain a solid component as a precursor of the activated carbon layer. Subsequently, the solid component is carbonized to form an activated carbon layer to wrap and to be directly in contact with the surface of the mesh, thereby obtaining an activated carbon cloth. In some embodiments, the activated carbon layer may wrap the entire surface of the mesh. Alternatively, the activated carbon layer may wrap parts of the surface of the mesh, and expose other parts of the mesh.

In some embodiments, the step of carbonizing is performed at a temperature of 250° C. to 400° C. This temperature can be adjusted according to the mesh material. If the mesh has a higher heat resistance, the carbonization temperature can be increased. Otherwise, the carbonization temperature can be lowered if the mesh has a lower heat resistance. If the carbonation temperature is too high, the mesh will be cracked. If the carbonization temperature is too low, the solid component cannot be completely transferred to the activated carbon layer, thereby deteriorating the properties of the activated carbon cloth.

In some embodiments, the method further includes performing an acid washing step after the carbonizing step to remove (C) ionic compound from the activated carbon layer. If (C) ionic compound such as zinc chloride is remained in the activated carbon layer, the specific surface area of the activated carbon layer will be reduced, and even fail to meet the standard of no heavy metal residue for some products.

In some embodiments, the mesh includes glass fabric, ceramic fiber cloth, or metal fiber cloth. Specifically, the mesh can be glass fabric, and the activated carbon layer may wrap the surface of the glass fibers in the glass fabric. On the other hand, the weight of the mesh and the weight of the activated carbon layer have a ratio of 1:0.05 to 1:0.3. If the amount of the activated carbon layer is too low, the pores formed in the activated carbon layer tend to be meso-pores or larger, thereby lowering the specific surface area of the activated carbon layer. If the amount of the activated carbon layer is too high, (C) ionic compound may be remained in the pores of the activated carbon layer and be difficult to be removed, thereby also lowering the specific surface area of the activated carbon layer. In some embodiments, the activated carbon cloth may have a specific surface area of 130 $m^2/g$ to 500 $m^2/g$. If the specific surface area of the activated carbon layer is too small, the adsorption ability of the activated carbon layer will be weakened to shorten its lifespan.

In some embodiments, because the gas permeability of the activated carbon cloth is greater than or equal to 2 $cc/cm^2 \cdot sec$, the methylene blue adsorption of the activated carbon layer can be higher than or equal to 54 mg/g (or even achieving 134 mg/g), and the surface resistance of the activated carbon layer is less than or equal to $10^7 \Omega/\square$, the activated carbon cloth can be used as an adsorption material for organic solvent and waste gas, an air filter element, or a dust filter bag. It should be noted that the activated carbon cloth can be used in any other applications and have corresponding properties, and is not limited to the described applications and the properties.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In the following Examples, an unexposed recycled photoresist was selected as a source of a phenolic resin and a diazonaphthoquinone compound, in which the phenolic resin and diazonaphthoquinone compound had a weight ratio of 0.7:0.3. In addition, the organic solvent was propylene glycol methyl ether acetate (PGMEA), and the ionic compound was zinc chloride. In addition, the commercially available phenolic resin (PR series for photoresist, commercially available from Sumitomo Bakelite Co., Ltd.) and commercially available diazonaphthoquinone compound (SMS-5PAC series, commercially available from SMS Technology) could be directly mixed. The mesh in the following Examples could be glass fabric (7628 series, commercially available from Glotech Industrial Co.).

In the following Examples, the decomposition temperature of the solid component obtained after removing the PGMEA in the impregnation liquid was measured by thermogravimetric analysis (TGA). The specific surface area of the activated carbon cloth was measured by nitrogen adsorption-desorption test (BET method). The methylene blue adsorption of the activated carbon cloth (e.g. the methylene blue adsorption of the activated carbon cloth (mg)/activated carbon layer (g)) was measured by the standard JIS K 1474). The cracking degree of the activated carbon cloth was measured by the standard method of testing tearing strength of fabrics (ASTM D2261). The adhesion of the activated carbon layer was measured by the standard test method for rating adhesion by tape test (ASTM D3359). In addition, the weight of the activated layer could be obtained as subtracting the weight of the glass fiber cloth from the activated carbon cloth. The weight ratio of the activated carbon layer in the activated carbon cloth could be obtained as dividing the weight of activated carbon layer by the weight of the activated carbon cloth.

Example 1

30 g of the unexposed recycled photoresist, 30 g of zinc chloride, and 140 g of PGMEA were mixed to form an impregnation liquid. Zinc chloride, the diazonaphthoquinone compound, and the phenolic resin had a weight ratio of 1:0.3:0.7, and the impregnation liquid had a solid content of 30 wt %.

A glass fabric was impregnated into the impregnation liquid for 5 minutes, then taken out from the impregnation liquid to be heated to 150° C. and kept at 150° C. for 5 minutes, and then heated to 180° C. and kept at 180° C. for 60 minutes, thereby removing PGMEA and remaining a solid component on the glass fabric. The solid component-containing glass fabric was put into a high temperature sintering furnace, heated to 400° C. by a rate of 5° C./min and carbonized under a mixture gas of 75% nitrogen and 25% of hydrogen to form an activated carbon layer. The carbonized product was cooled to room temperature, and then alternately washed by 0.5 N HCl and water several times to remove zinc chloride from the activated carbon layer. Subsequently, the washed product was baking dried to obtain an activated carbon cloth. The composition ratios of the impregnation liquid are shown in Table 1, and the properties of the activated carbon cloth are shown in Table 2.

Example 2

30 g of the unexposed recycled photoresist, 15 g of zinc chloride, and 105 g of PGMEA were mixed to form an impregnation liquid. Zinc chloride, the diazonaphthoquinone compound, and the phenolic resin had a weight ratio of 0.5:0.3:0.7, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2.

Example 3

10 g of the unexposed recycled photoresist, 10 g of zinc chloride, and 180 g of PGMEA were mixed to form an impregnation liquid. Zinc chloride, the diazonaphthoquinone compound, and the phenolic resin had a weight ratio of 1:0.3:0.7, and the impregnation liquid had a solid content of 10 wt %. The following steps of forming the activated carbon cloth were same as those in Example 1. The composition ratios of the impregnation liquid are shown in Table 1, and the properties of the activated carbon cloth are shown in Table 2.

Example 4

30 g of the unexposed recycled photoresist, 30 g of zinc chloride, and 140 g of PGMEA were mixed to form an impregnation liquid. Zinc chloride, the diazonaphthoquinone compound, and the phenolic resin had a weight ratio of 1:0.3:0.7, and the impregnation liquid had a solid content of 30 wt %. The following steps of forming the activated carbon cloth were similar to those in Example 1, and the difference in Example 4 was the carbonization temperature being 350° C. The composition ratios of the impregnation liquid are shown in Table 1, and the properties of the activated carbon cloth are shown in Table 2.

Example 5

27 g of the phenolic resin, 3 g of the diazonaphthoquinone compound, 30 g of zinc chloride, and 140 g of PGMEA were mixed to form an impregnation liquid. Zinc chloride, the diazonaphthoquinone compound, and the phenolic resin had a weight ratio of 1:0.1:0.9, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2.

Example 6

6 g of the phenolic resin, 24 g of the diazonaphthoquinone compound, 30 g of zinc chloride, and 140 g of PGMEA were mixed to form an impregnation liquid. Zinc chloride, the diazonaphthoquinone compound, and the phenolic resin had a weight ratio of 1:0.8:0.2, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2.

Example 7

30 g of the unexposed recycled photoresist, 30 g of zinc chloride, and 60 g of PGMEA were mixed to form an impregnation liquid. Zinc chloride, the diazonaphthoquinone compound, and the phenolic resin had a weight ratio of 1:0.3:0.7, and the impregnation liquid had a solid content of 50 wt %. The following steps of forming the activated carbon cloth were same as those in Example 1. The composition ratios of the impregnation liquid are shown in Table 1, and the properties of the activated carbon cloth are shown in Table 2.

Comparative Example 1

30 g of the phenolic resin, 30 g of zinc chloride, and 140 g of PGMEA were mixed to form an impregnation liquid. Zinc chloride, the diazonaphthoquinone compound, and the phenolic resin had a weight ratio of 1:0:1, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2. As shown in Table 2, the activated carbon layer of the activated carbon cloth formed from the impregnation liquid without the diazonaphthoquinone compound had an overly low specific surface area.

Comparative Example 2

60 g of the unexposed recycled photoresist and 140 g of PGMEA were mixed to form an impregnation liquid. Zinc chloride, the diazonaphthoquinone compound, and the phenolic resin had a weight ratio of 0:0.3:0.7, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2. As shown in Table 2, the activated carbon layer of the activated carbon cloth formed from the impregnation liquid without the zinc chloride had an extremely low specific surface area.

Comparative Example 3

30 g of the unexposed recycled photoresist, 30 g of potassium hydroxide, and 140 g of PGMEA were mixed to form an impregnation liquid. Potassium hydroxide, the diazonaphthoquinone compound, and the phenolic resin had a weight ratio of 1:0.3:0.7, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2. As shown in Table 2, the activated carbon cloth formed from the impregnation liquid with the potassium hydroxide other than zinc chloride would crack.

Comparative Example 4

30 g of the unexposed recycled photoresist, 30 g of zinc chloride, and 140 g of PGMEA were mixed to form an impregnation liquid. Zinc chloride, the diazonaphthoquinone compound, and the phenolic resin had a weight ratio of 1:0.3:0.7, and the impregnation liquid had a solid content of 30 wt %. The following steps of forming the activated carbon cloth were similar to those in Example 1, and the difference in Comparative Example 4 was the carbonization temperature being increased to 500° C. The composition ratios of the impregnation liquid are shown in Table 1, and the properties of the activated carbon cloth are shown in Table 2. As shown in Table 2, the overly high carbonization temperature would result in the activated carbon cloth crack.

Comparative Example 5

30 g of the unexposed recycled photoresist, 3 g of zinc chloride, and 77 g of PGMEA were mixed to form an impregnation liquid. Zinc chloride, the diazonaphthoquinone compound, and the phenolic resin had a weight ratio of 0.1:0.3:0.7, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2. As shown in Table 2, the activated carbon layer of the activated carbon cloth formed from the impregnation liquid with the overly low amount of zinc chloride had an extremely low specific surface area.

Comparative Example 6

30 g of the unexposed recycled photoresist, 45 g of zinc chloride, and 175 g of PGMEA were mixed to form an impregnation liquid. Zinc chloride, the diazonaphthoquinone compound, and the phenolic resin had a weight ratio of 1.5:0.3:0.7, and the impregnation liquid had a solid content of 30 wt %. The impregnation liquid could not adhere onto the glass fiber cloth.

Comparative Example 7

3 g of the phenolic resin, 27 g of the diazonaphthoquinone compound, 30 g of zinc chloride, and 140 g of PGMEA were mixed to form an impregnation liquid. Zinc chloride, the diazonaphthoquinone compound, and the phenolic resin had a weight ratio of 1:0.9:0.1, and the impregnation liquid had a solid content of 30 wt %. The following steps of forming the activated carbon cloth were same as those in Example 1. The composition ratios of the impregnation liquid are shown in Table 1, and the properties of the activated carbon cloth are shown in Table 2. As shown in Table 2, the activated carbon layer of the activated carbon cloth formed from the impregnation liquid with an overly high amount of the diazonaphthoquinone compound had an overly low specific surface area.

TABLE 1

| | | Solid content of the impregnation liquid(wt %) | Impregnation liquid composition (weight ratio) | | | |
|---|---|---|---|---|---|---|
| | | | Phenolic resin | diazonaphthoquinone compound | Zinc chloride | Potassium hydroxide |
| Example | 1 | 30 | 0.7 | 0.3 | 1.0 | — |
| | 2 | 30 | 0.7 | 0.3 | 0.5 | — |
| | 3 | 10 | 0.7 | 0.3 | 1.0 | — |
| | 4 | 30 | 0.7 | 0.3 | 1.0 | — |
| | 5 | 30 | 0.9 | 0.1 | 1.0 | — |
| | 6 | 30 | 0.2 | 0.8 | 1.0 | — |
| | 7 | 50 | 0.7 | 0.3 | 1.0 | — |
| Comparative Example | 1 | 30 | 1.0 | — | 1.0 | — |
| | 2 | 30 | 0.7 | 0.3 | — | — |
| | 3 | 30 | 0.7 | 0.3 | — | 1.0 |
| | 4 | 30 | 0.7 | 0.3 | 1.0 | — |
| | 5 | 30 | 0.7 | 0.3 | 0.1 | — |
| | 6 | 30 | 0.7 | 0.3 | 1.5 | — |
| | 7 | 30 | 0.1 | 0.9 | 1.0 | — |

TABLE 2

| | | Carbonization temperature (° C.) | Thermal degradation temperature of the photoresist (° C.) | Activated carbon layer ratio (wt %) | Specific surface area of the activated carbon layer ($m^2/g$) | Methylene blue adsorption of the activated carbon layer (mg/g) | Cracking degree** | Adhesion of the activated carbon layer*** |
|---|---|---|---|---|---|---|---|---|
| Example | 1 | 400 | 254 | 13.4 | 477 | 134 | ○ | ○ |
| | 2 | 400 | 298 | 13.2 | 305 | 61 | ○ | ○ |
| | 3 | 400 | 260 | 9.3 | 173 | 54 | ○ | ○ |
| | 4 | 350 | 254 | 13.4 | 378 | 119 | ○ | ○ |
| | 5 | 400 | 316 | 12.2 | 134 | 98 | ○ | ○ |
| | 6 | 400 | 302 | 11.2 | 144 | 107 | ○ | ○ |
| | 7 | 400 | 254 | 15.4 | 480 | 117 | ○ | ○ |

TABLE 2-continued

|  |  | Carbonization temperature (° C.) | Thermal degradation temperature of the photoresist (° C.) | Activated carbon layer ratio (wt %) | Specific surface area of the activated carbon layer (m²/g) | Methylene blue adsorption of the activated carbon layer (mg/g) | Cracking degree** | Adhesion of the activated carbon layer*** |
|---|---|---|---|---|---|---|---|---|
| Comparative Example | 1 | 400 | 314 | 11.7 | 106 | 103 | ○ | ○ |
|  | 2 | 400 | 345 | 10.0 | 5.5 | ~0 | ○ | ○ |
|  | 3 | 400 | 293 | 14.5 | 174 | 103 | X | ○ |
|  | 4 | 500 | 254 | 13.4 | 139 | 97 | X | ○ |
|  | 5 | 400 | — | — | 10.2 | 20 | ○ | ○ |
|  | 6 | 400 | — | — | — | — | — | X |
|  | 7 | 400 | 305 | 10.3 | 123 | 97 | ○ | X |

**Cracking degree: ○ = Not crack, X = crack
***Adhesion of the activated carbon layer: ○ = not peeled, X = directly peeled It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An impregnation liquid, comprising:
   (A) phenolic resin;
   (B) diazonaphthoquinone-based compound or a derivative thereof;
   (C) ionic compound; and
   (D) organic solvent,
   wherein a weight of (A) phenolic resin and a weight of (B) diazonaphthoquinone-based compound or a derivative thereof have a ratio of 0.2:0.8 to 0.9:0.1,
   wherein a weight of (C) ionic compound and a total weight of (A) phenolic resin and (B) diazonaphthoquinone-based compound or a derivative thereof have a ratio of 0.2:1 to 1.4:1, and
   wherein (C) ionic compound is zinc chloride.

2. The impregnation liquid as claimed in claim 1, wherein a total weight of (A) phenolic resin, (B) diazonaphthoquinone-based compound or a derivative thereof, and (C) ionic compound and a weight of (D) organic solvent have a ratio of 0.1:0.9 to 0.5:0.5.

3. The impregnation liquid as claimed in claim 1, wherein (A) phenolic resin is thermoplastic phenolic resin.

4. The impregnation liquid as claimed in claim 1, wherein (B) diazonaphthoquinone-based compound or a derivative thereof comprises diazonaphthoquinone-based compound, sulfonated diazonaphthoquinone compound, sulfonated indeno-enone compound, sulfonated indeno-carboxylic acid compound, or a combination thereof.

5. The impregnation liquid as claimed in claim 1, wherein (D) organic solvent comprises propylene glycol methyl ether acetate, propylene glycol methyl ether, N-methylpyrrolidone, acetone, or butanone.

6. A method of forming activated carbon cloth, comprising:
   putting a mesh into the impregnation liquid as claimed in claim 1, and the impregnation liquid adheres onto a surface of the mesh;
   removing (D) organic solvent of the impregnation liquid to remain a solid component; and
   carbonizing the solid component to form an activated carbon layer to wrap and to be directly in contact with the surface of the mesh, thereby obtaining an activated carbon cloth.

7. The method as claimed in claim 6, wherein the step of carbonizing is performed at a temperature of 250° C. to 400° C.

8. The method as claimed in claim 6, further performing an acid washing step after the carbonizing step to remove (C) ionic compound from the activated carbon layer.

9. The method as claimed in claim 6, wherein the mesh comprises glass fabric, ceramic fiber cloth, or metal fiber cloth.

* * * * *